Aug. 7, 1934.　　　　M. H. RHODES　　　　1,969,034
SWITCH
Filed April 9, 1932　　　7 Sheets-Sheet 1

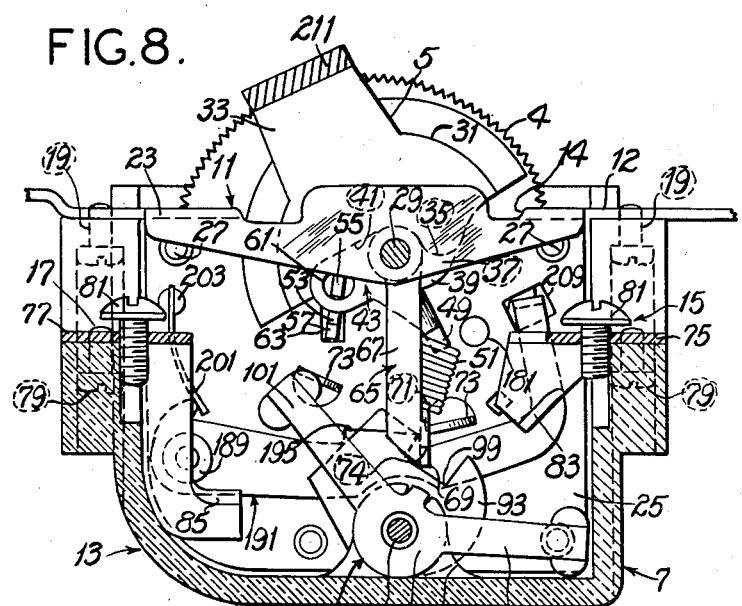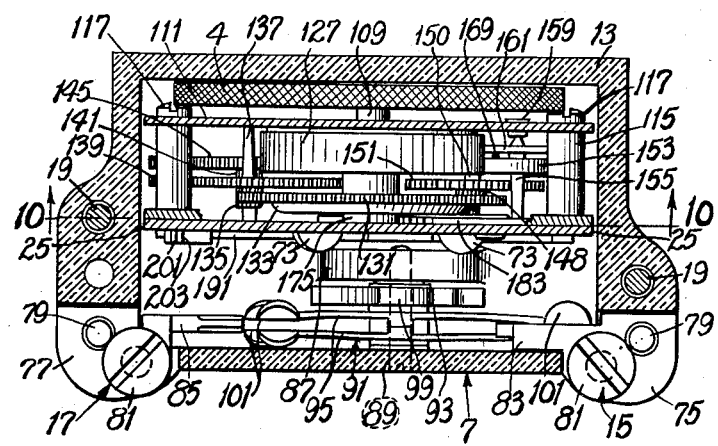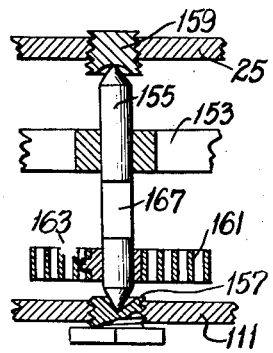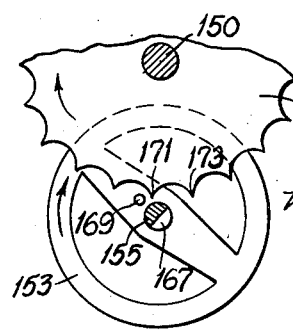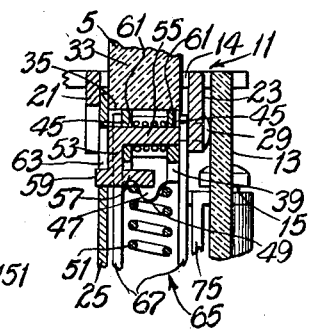

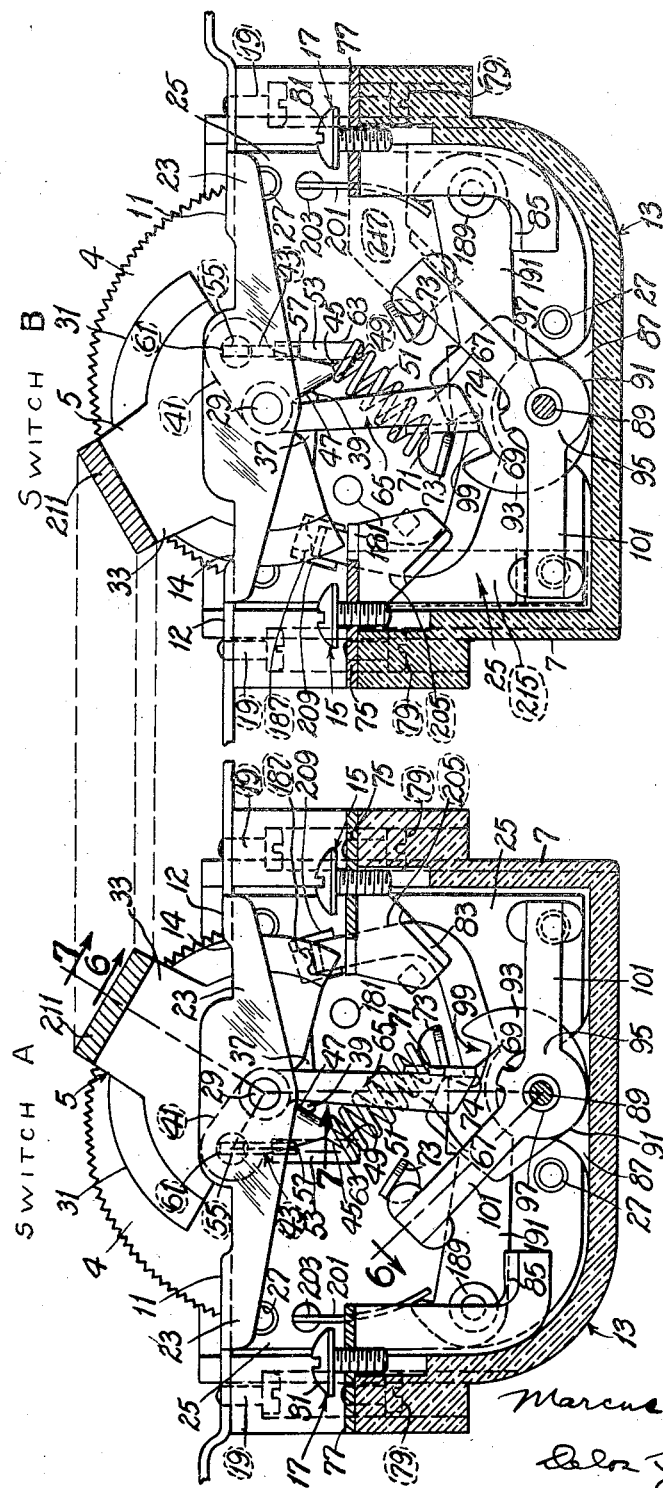

Aug. 7, 1934.  M. H. RHODES  1,969,034
SWITCH
Filed April 9, 1932  7 Sheets-Sheet 4

Marcus H. Rhodes, Inventor.
Delos F. Haynes, Attorney.

Marcus H. Rhodes,
Inventor.
Delos G. Haynes
Attorney

Aug. 7, 1934.    M. H. RHODES    1,969,034

SWITCH

Filed April 9, 1932    7 Sheets-Sheet 6

Marcus H. Rhodes,
Inventor,
Delos G. Haynes,
Attorney.

Aug. 7, 1934.  M. H. RHODES  1,969,034
SWITCH
Filed April 9, 1932  7 Sheets-Sheet 7

Marcus H. Rhodes,
Inventor,
Delos G. Haynes,
Attorney.

Patented Aug. 7, 1934

1,969,034

UNITED STATES PATENT OFFICE

1,969,034

SWITCH

Marcus H. Rhodes, Hartford, Conn., assignor to M. H. Rhodes, Inc., Hartford, Conn., a corporation of Delaware Application April 9, 1932, Serial No. 604,279

9 Claims. (Cl. 200—39)

This invention relates to switches, and with regard to certain more specific features, to time-controlled, delayed action switches.

Among the several objects of the invention may be noted the provision of a switch of the class described, which, by means of a single manipulative or setting action, may be made to perform two or more events in the future, without later manipulative or setting actions; the provision of a switch of the class described wherein said two or more future events may be changed or altered at will prior to and after said manipulative action has been effected; and the provision of a switch of the class described which is relatively simple in construction and operation and which occupies a minimum of space when mounted for operation. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a front elevation of a switch made in accordance with the teaching of the present invention;

Fig. 4 is a horizontal cross-section taken substantially on line 4—4 of Fig. 2;

Fig. 5 is an ideal section taken substantially along line 5—5 of Fig. 1;

Fig. 6 is an ideal section taken along line 6—6 of Fig. 5;

Fig. 7 is a fragmentary section taken along line 7—7 of Fig. 5;

Fig. 8 is a vertical section similar to a portion of Fig. 5, but showing the switch in a condition of operation advanced from that of Fig. 5;

Fig. 13 is a fragmentary horizontal section taken along line 13—13 of Fig. 11.

Fig. 14 is a fragmentary section taken along line 14—14 of Fig. 11;

Figure 1:
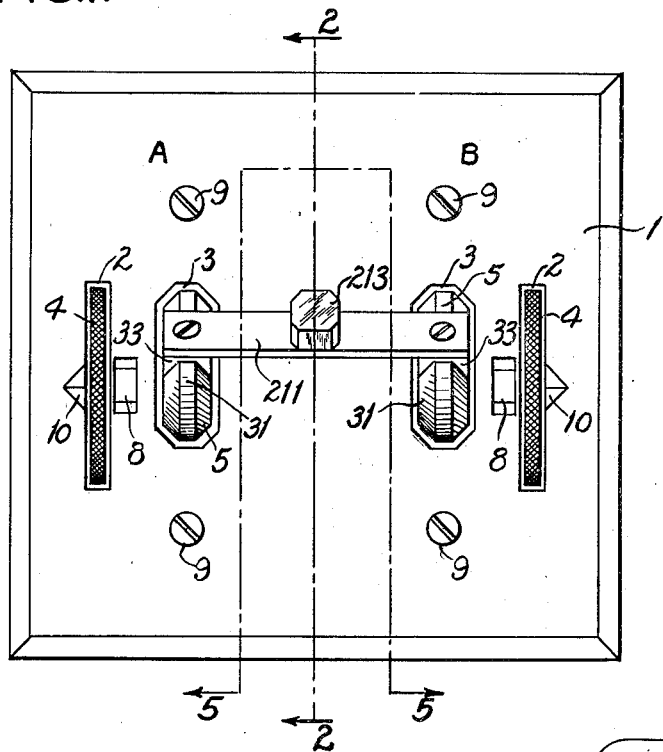

Figs. 16 to 31, inclusive, are diagrammatic illustrations of various sequence of operations achievable with the switch embodying the present invention.

Similar reference characters indicate corresponding parts throughout the several views of the drawings.

The present invention is related to the invention disclosed in my copending application 578,596, filed December 2, 1931, in that the present invention includes a double set of the switches particularly described in said copending application, but with certain changes and additional elements included to effect an entirely different set of actions. More specifically, it may be noted that Fig. 1 of the present invention shows a face plate upon which is mounted in adjacent relationship a pair of switches indicated broadly by the index characters A and B. Switch A is, generally speaking, identical to the switch shown in application, Serial Number 578,596, while switch B is of the same general construction, but reversed as to the position of parts, as the switch described in said application Serial Number 578,596. That is, switch B may be considered to be a mirror image of switch A.

In order to facilitate description of the present switch, as a whole, a detailed description of the switch A will be given; it is to be understood that the switch B is identical to switch A with the exception that it is reversed as to location of parts, or is a mirror image, as described above.

Figure 2:
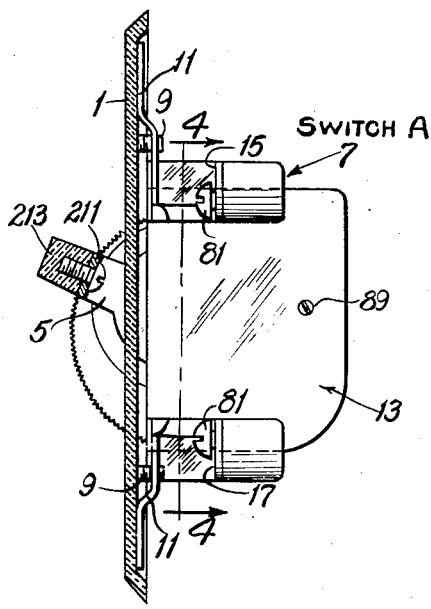
Fig. 2 is a vertical section taken substantially on line 2—2 of Fig. 1.

Referring now more particularly to Figs. 1 and 2, numeral 1 indicates a flush face plate of the type in general use for wall mounting of electrical switches. Central openings 3 permit control handles 5 of switches A and B, indicated by numerals 7, to extend outwardly to an available manipulating position. Screws 9 hold the face plate 1 to the switches 7.

A second set of openings 2 in the face plate 1 permit knurled setting wheels 4 to project through said face plate 1. The wheels 4 permit adjustment of the time at which electrical connection will be made and broken as will appear more fully hereinafter. Noses or pointers 10 are provided on the face plate 1 for indicating, by relation to suitable indicia on the wheels 4, the time at which connections will be made and broken.

A third set of openings 8 in the face plate 1 permit reading of suitable indicia upon dials formed in the switches, as will appear more fully hereinafter.

From the exterior, each switch 7 will be seen to comprise a mounting plate 11 (with which the face plate screws 9 engage) and a switch housing 13 having exterior connecting terminals 15 and 17 mounted thereon. The housing 13 is preferably formed of an insulating material, such as a phenolic condensation product or the like. The housing 13 is held to the mounting plate 11 by screws 19 (see Figs. 4 and 5).

Figure 3:
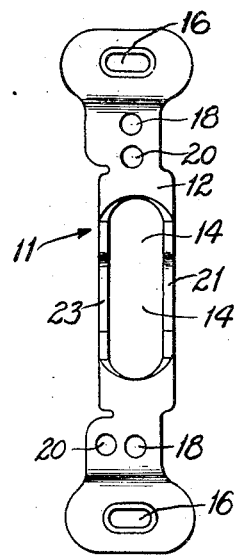
Fig. 3 is a plan view of a supporting plate.

A mounting plate 11 is illustrated in detail in Fig. 3. It will be seen that it comprises a long, relatively narrow vertical portion 12 having sideward portions 21 and 23 extending at right angles from the general plane of the plate. A central opening 14 permits the passage of the switch handle 5. Openings 16 at the extremities of the plate 11 permit attachment of the switch as a whole to a permanently installed wall housing or the like. Threaded holes 18 are provided to receive the face plate mounting screws 9 and threaded holes 20 to receive the switch housing mounting screws 19.

The switch 7 per se, as it fits within the housing 13, comprises generally a contactor bar which is actuated to movement by mechanical means, and a timing system which in turn intercepts the operation of the mechanical actuating means. For purposes of description, the mechanical means (including the contactor bar) and the time control means will be described separately and then correlated.

Referring now more particularly to Figs. 4 and 5, it will be seen that a plate 25, which is shaped with substantially the same contour as the housing 13, is attached to the portion 21 of the mounting plate 11 by means of rivets or spot welding or the like as indicated at numeral 27 in Fig. 5. Supported at one side in the plate 25, and at the other side in the sideward portion 23, is a pin 29, upon which the control hand 5 is rotated.

The switch control handle 5 comprises a semi-circular portion 31 from which extends a knob 33 for manipulation purposes. The back, concealed (in the assembled switch) portion of the switch 5 is reduced in thickness as at numeral 35 (Figs. 6 and 7) and has a contour including a projection 37 having a nose 39 thereon, and a depression, or hollowed-out portion 41. The pin 29 upon which the handle 5 is rotated passes through the thin portion 35, in the region of the projection 37.

Mounted rigidly on the switch handle 5, embracing the thin portion 35 thereof, and extending into the depression 41, is a saddle member 43. This saddle 43 comprises a pair of legs 45, which fit snugly against the sides of the handle 5, and has a cross-piece 47 at right angles to the legs 45. The pin 29 passes through the legs 45. The cross-piece 47 engages the nose 39 of the projection 37 of the switch 5, whereby the saddle 43 is, relative to rotation on the pin 29, fixed to the handle 5. That is to say, the saddle 43 is mounted on the handle 5 in a fixed, non-rotatable manner. The cross-piece 47 is provided with a nose 49 which engages one end of a compression spring 51 to be described more in detail hereinafter.

Associated with the saddle 43 is a movement limiting means for the handle 5 (see Fig. 7). The movement limiting means per se comprises a flat H shaped piece 53, having parallel legs 55 and 57, and a single extending leg 59. The leg 55 passes loosely through a pair of holes 61 in the legs 45 of the saddle 43. The single extending leg 59 passes through a slot 63 in the plate 25 having a predetermined length. Considering that the saddle 43 is fixed to the handle 5, and that the plate 25 is relatively a part of the stationary ground wherein the handle 5 rotates, it will be seen that engagement of the single extending leg 59 with the ends of the slot 63 limits the rotation or movement of the handle 5.

Also mounted on the pin 29, in this instance rotatably mounted, is a second saddle 65 embracing the saddle 43. The saddle 65, hereinafter termed the hammer saddle, (see Fig. 6) comprises a pair of relatively long legs 67, through which the pin 29 passes (loosely enough to permit of ready rotation), and a hammer portion 69 at right angles thereto. The hammer portion 69 has a nose 71 thereon which engages the other end of the compression spring 51. Movement of the hammer saddle 65 is limited by a pair of ears 73 struck from the plate 25. A notch 74 permits the passage of a latching means as will be described more particularly hereinafter.

It will be seen that the saddles 43 and 65 together with the compression spring 51 comprise an over-centering toggle. In Fig. 5, motion of the handle 5 in a leftward direction, through the saddle 43, compresses the spring 51 against the saddle 65, which is immovable because of its engagement with the right-hand ear 73, until the saddles 43 and 65 pass the parallel position, at which time the compressed spring reacts to suddenly throw the hammer saddle 65 to the left against the left-hand movement-limiting ear 73. A similar reaction and overcentering action causes the hammer saddle 65 to snap sharply from the left to the right, when the handle 5 is moved back to its right-hand position.

In this manner, the switch functions to make and break connections with a quick, positive, snap action, and arcing and sparking are thus avoided.

The electrical connections in the switch will be seen particularly in Figs. 4, 5, 8 and 9. The exterior terminals 15 and 17 comprise, respectively, metallic strips 75 and 77 which are held to the housing 13 by means of screws 79, and which receive in threaded engagement screws 81 (see Fig. 4). By means of the screws 81, exterior connections to the switch are made. The metallic strip 75 extends into the housing 13, spaced from the side wall thereof, and is provided with a slanting knife-edge contacting portion 83. The metallic strip 77 extends into the housing 13, also spaced from the side wall thereof, and is provided with a knife-edge contacting portion 85 similar to the contacting portion 81, but facing in a different direction.

Formed in interior of the back of the housing 13 is a protruding ear 87. A pin or shaft 89 passes through the side of the housing 13 and threadedly engages the ear 87 (see Figs. 4 and 6). On the pin 89 is rotatably mounted a contactor bar-anvil assembly 91. The parts of the assembly 91 are non-rotatable or otherwise movable relative to each other, but the assembly as a whole rotates freely on the pin 89.

The assembly 91 comprises an anvil piece 93, and a contactor bar 95, together with suitable spacing washers, all mounted on a sleeve 97 through which passes the pin 89. The anvil piece 93, preferably formed of insulating material, includes a notch 99 which engages the hammer portion 69 of the hammer saddle 65 (see Fig. 5). The contactor bar 95 comprises a pair of spring-metal strips 101 shaped to engage and disengage, by rotation on the pin 89, the knife-edge contacting strips 83 and 85. The relative shape of the bar 95 and the spacing of the contacting strips 83 and 85 will be apparent from Fig. 5.

Figure 9:
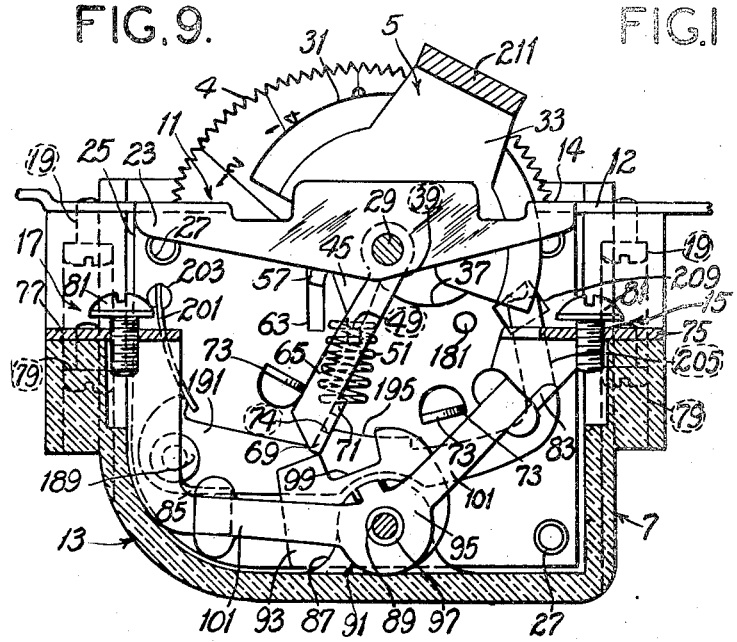
Fig. 9 is a vertical section similar to Figs. 5 and 8 illustrating the switch in a still further advanced condition of operation.

As the hammer saddle 65 snaps from Fig. 5 position to Fig. 9 position, as described hereinbefore, its engagement with the notch 99 in the anvil piece 93 causes the assembly 91 to rotate, as a whole, on the pin 89, and consequently causes the contactor bar 95 to rotate into and out of contact with the pieces 83 and 85. Thus making and breaking of an electrical connection from terminal 15 to terminal 17 is effected in a sudden, snap-acting manner by simple movement of the switch control handle 5.

It is accordingly seen, considering for the present that no time-controlled latching means is in operation, that making and breaking of an electrical connection between terminals 15 and 17 is effected in a sudden, snap-acting manner by a simple movement of the switch control handle 5.

Figure 10:
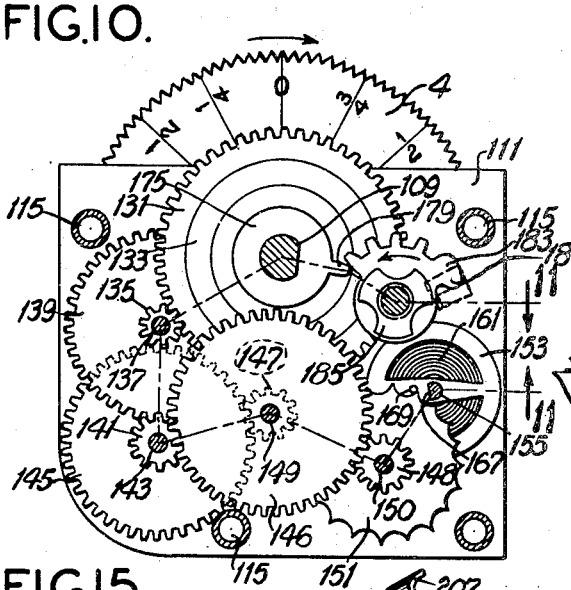
Fig. 10 is a vertical section taken substantially along line 10—10 of Fig. 4.

The time controlling mechanism is illustrated generally in Figs. 4 and 10.

Referring now more particularly to Fig. 10, it will be seen that the knurled wheel 4 is mounted on a main shaft 109, which is in turn supported at one end in a plate 111 and at the other in the plate 25. The plate 111 is substantially the same shape as the plate 25, described hereinbefore in connection with the switch construction. The plate 111 is supported on the plate 25 in spaced relationship by means of spacing collars 115 and screws 117 (see Fig. 4).

Figure 11:
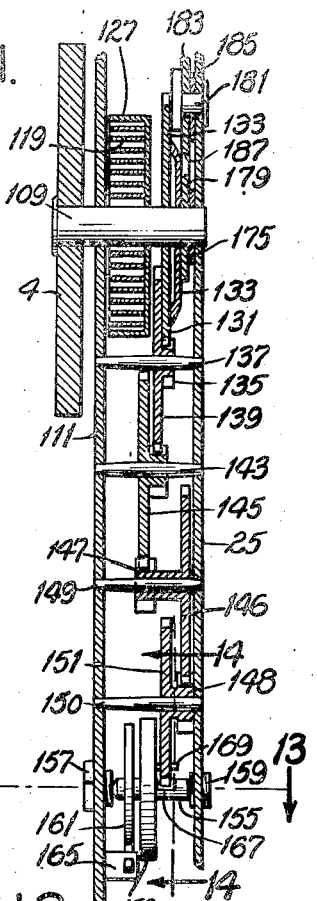
Fig. 11 is an ideal section taken along line 11—11 of Fig. 10.
Figure 12:
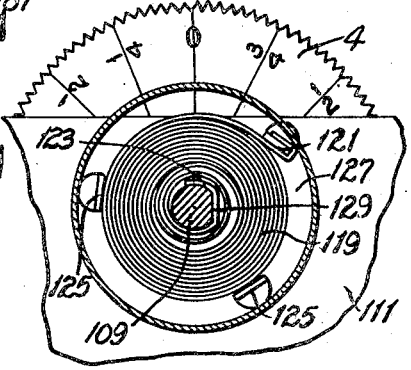
Fig. 12 is a fragmentary elevation illustrating the manner in which a main spring is mounted.

Mounted on the main shaft 109 in such a manner as to react against the relatively stationary plate 111 is a main spring 119 (Fig. 11). The manner of mounting the main spring 119 is illustrated more in detail in Fig. 12 where it will be seen that one end of said spring passes around and hooks upon an ear 121 struck from the plate 111, while the other end of said spring 119 is hooked over a projection 123 formed on the main shaft 109. A pair of ears 125, likewise struck from the plate 111, serves to hold the main spring 119 in coiled form.

In order to prevent the main spring 119 from releasing sidewardly, and in order to provide additional protection against the main spring 119 uncoiling, a main spring protecting cover 127 is provided on the main shaft 109 (see also Fig. 11). The knurled wheel 4 and the main spring cover 127 are prevented from rotating on the main shaft 109 because they are formed so as to engage a flattened portion 129 on the main shaft 109 (see Fig. 12).

The main spring cover 127 may bear on the periphery thereof suitable index characters which are visible through the opening 8 in the face plate 1 and thus provides means for reading the extent to which the main spring is wound, as will appear more fully hereinafter.

It will accordingly be seen that turning of the knurled wheel 4 winds up the main spring 119, thereby occasioning a reverse torque on the main shaft 109.

An escapement mechanism is provided to permit the torque so produced in the main spring 119 to expend itself by rotating the main shaft 109 only at a predetermined rate of speed. This escapement is shown in Figs. 10 and 11. A large gear 131 is mounted loosely on the main shaft 109. A friction disk 133 is mounted in a nonrotatable manner on the main shaft 109 in juxtaposition to the large gear 131, in such a manner that the shaft 109 may turn, when winding up the main spring 119, without rotating the large gear 131, but also so that the frictional engagement of the disk 133 with the gear 131 will not permit the main spring 119, after it has been wound up, to unwind without turning the gear 131, which is itself connected to the regulating escapement mechanism. It is thus seen that the gear 131 remains stationary when the main spring 119 is wound by rotation of the knurled wheel 4, but that on unwinding of the main spring 119, the gear 131 is effectively nonrotatable upon the main shaft 109.

Engaging the teeth of the gear 131 is a gear train. In the present embodiment the gear train comprises a pinion 135, driven by the gear 131, and which is mounted on a shaft 137 supported between the plates 111 and 25. Also mounted upon the shaft 137 in an immovable fashion is a large gear 139. The large gear 139 in turn drives a second pinion 141 on a shaft 143 having a second large gear 145 mounted thereon. The pinion 141, shaft 143, and large gear 145 are, respectively, similar to the pinion 135, shaft 137, and large gear 139.

The large gear 145 in its turn drives a third pinion 147, similar to the pinions 135 and 141, which is mounted on a shaft 149, similar to the shafts 137 and 143. Immovably mounted on the shaft 149 is also a large gear 146, which is similar to the gears 139 and 145. The large gear 146 in its turn drives a pinion 148, mounted on a shaft 150. Immovably mounted on the shaft 150 is also a sprocket wheel 151, the shape of which will be more apparent by inspection of Fig. 14. The shafts 137, 143, 149, and 150 are all supported by end bearings in the plates 111 and 25.

It will be seen that there is a large increase in angular motion from the gear 131 to the sprocket wheel 151, or, considering it in the reverse manner, there is a large decrease in angular motion from the sprocket wheel 151 to the gear 131. This increase or decrease, considered either way, is controlled by the relative sizes of the gears 131, 139, 145, and 146, and the pinions 135, 141, 147, and 148.

Engaging with the sprocket wheel 151 is the escapement mechanism per se. This escapement mechanism (see also Figs. 13 and 14) comprises a balance wheel 153 mounted on a balance wheel shaft 155, which is pivoted between bearing plates 157 and 159 which are threaded into the plates 111 and 25, respectively. The bearing plate 157 is provided with a square head so that adjustment of the pressure on the shaft 155 may be effected. In general, the bearing plates 157 and 159 are adjusted so that the shaft 155 turns loosely in them.

A hair spring 161 is secured at one end to the shaft 155, as indicated at numeral 163 (Fig. 13), and at the other end to the relatively stationary plate 111, as at numeral 165 (Fig. 11). This hair spring 161 is arranged to provide a small counter-clockwise torque on the shaft 155, as viewed from the side represented by the plate 111.

The shaft 155 is provided with a notch 167 cut therein, at the region of its engagement with the sprocket wheel 151. The notch 167, when in a proper position, permits the sprocket wheel 151 to turn freely, as will be described hereinafter.

Extending at substantially a right angle from a spoke of the balance wheel 153 is a pin 169. The pin 169 engages teeth of the sprocket wheel 151 and cooperates with the notch 167 to form an intermittent escapement mechanism for the sprocket wheel 151. This escapement operation will be apparent by reference to Fig. 14. In Fig. 14, there is a clockwise torque on the sprocket wheel 151 provided by the main spring 119 acting through the gear train 131, 135, 139, 141, 145, 147, 146 and 148. There is a smaller counterclockwise torque on the balance wheel 153 provided by the hair spring 161. The torque on the balance wheel 153 forces the pin 169 against the edge of a tooth 171 of the sprocket wheel 151. The greater torque on the tooth 171 causes it to advance, thereby forcing the pin 169, by a cam action, to rotate against the torque of the hair spring 161. Rotation of the pin 169 causes coextensive rotation of the balance wheel 153, and the balance wheel shaft 155. The shaft 155 is thus caused to rotate in such a manner that the notch 167 is turned away from a next-advancing tooth 173 of the sprocket wheel 151. Without the notch 167 in proper position, the tooth 173 cannot pass the balance wheel shaft 155, and is stopped thereby.

Returning to the action of the tooth 171 on the pin 169, the force on said pin exerted by the tooth 171 is sufficiently great to occasion the rotation of said pin 169, against the torque of the hair spring 161, to an extent considerably greater than merely to pass over the crest of the tooth 171. In other words, the pin 169 is snapped away to rotate, say sixty degrees, against the hair spring 161. With the pin 169 out of the way, the sprocket wheel immediately turns until the next advancing tooth 173 is stopped by contact with the smooth, circular portion of the shaft 155. This tooth 173 cannot advance until the shaft 155 turns sufficiently for it to pass through the notch 167.

Meanwhile, the pin 169 reaches its maximum rotation against the hair spring 161, and the hair spring then at once reacts to reverse the direction of rotation of the pin 169 and thus force said pin back towards the sprocket wheel 151. With the tooth 173 against the shaft 155, the pin 169 is rotated into the depression between the teeth 171 and 173. This rotation of the pin 169 by the hair spring 161 occasions coextensive rotation of the shaft 155, with the result that as the pin 169 reaches a position of contact with the forward edge of the tooth 173, the notch 167 is brought into proper position to permit the forward rotation of the tooth 173, acting under the torque of the main spring 119. So advancing, the leading edge of the tooth 173 engages and rotates the pin 169 against the torque of the hair spring 161, and the action of the tooth 171 is thus repeated by the tooth 173.

In such a manner the balance wheel 153 and its attached parts serve to permit only timed, intermittent motion of the sprocket wheel 151, and, through the gear train 148, 147, 146, 145, 141, 139, 135, 131, the main shaft 109. By reason of the reduction effect of the gear train, as described hereinbefore, the main shaft 109 is accordingly permitted to rotate at only a very slow speed, and the main spring 119, after being wound up, thus unwinds only very slowly.

Returning to Fig. 10 it will be seen that there is affixed to the main shaft 109 a one-tooth pinion 175. A flat 177, or other suitable key means, is provided to secure the pinion 175 immovably on the shaft 109. The single tooth 179 of the pinion 175 provides the means whereby the latching operation for the switch mechanism per se is mechanically controlled by the timing mechanism hereinbefore described.

Suitably positioned on a shaft 181 mounted in the plate 111 is a sector gear 183. A spring washer 185 prevents the sector gear 183 from moving except under externally applied impulses. The number of teeth on the sector gear 183 is established to correlate with the maximum time setting it is desired to equip the mechanism for, as a whole. One tooth is provided for each desired complete revolution of the knurled wheel 4.

Also provided on the sector gear 183 is a nose or camming surface 187, which functions to actuate a latch lever to be described.

It will be seen that upon turning the knurled wheel 4 in a clockwise position, as indicated by the arrows in Fig. 10, the sector gear 183 is angularly displaced in a counterclockwise direction to the extent of one tooth for each complete revolution of the knurled wheel 4. This arrangement is highly advantageous, in that it permits the main spring 119 to be tensioned to an extent far greater than in prior devices, wherein the tensioning was limited to that occasioned by one revolution of the knurled wheel 4 only. In the embodiment as shown, the sector gear 183 provides means whereby the knurled wheel 4 may be rotated a maximum of four complete turns. It is evident, however, that by suitably increasing the number of teeth on the sector gear, this maximum number of revolutions may be increased to any desired number. Similarly, by reduction of the number of teeth on the sector gear 183, the total maximum number of revolutions of the knurled wheel 4 may be decreased.

Figure 15:
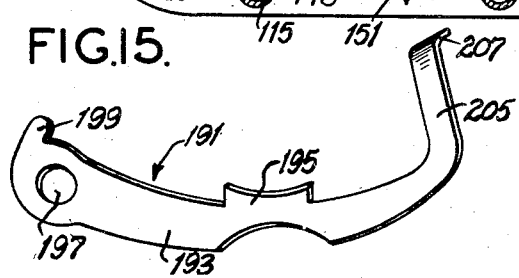
Fig. 15 is a trimetric view of a latch lever.

Rotatably mounted on a pin 189 held in the plate 25 (Fig. 5) is a latch lever 191 illustrated in detail in Fig. 15. Referring to Fig. 15, it will be seen that the latch lever comprises a relatively horizontal, long portion 193 which has an upwardly extending portion or arm 195. At one end of the portion 193 is a suitable hole 197 for accommodating the mounting pin 189. At the same end is a nose 199, which is arranged to engage a leaf spring 201 (see Fig. 5) suitably secured to the plate 25 as at numeral 203. The spring 201 reacting upon the nose 199 tends to rotate the latch lever 191 in a counterclockwise direction at all times. At the opposite end of the lever 191 is provided an upwardly extending arm or portion 205, which is upwardly terminated by an ear 207 stuck at right angles thereto. In assembly, the ear 207 passes through an opening 209 (see Fig. 5) in the plate 25, and is suitably positioned for engagement with the nose 187 on the sector wheel 183.

In assembly, the ear or portion 195 of the latch lever 191 alternately extends into the path of the striking portion 69 of the hammer saddle 65, or is removed to permit free passage thereof because of the notch 74. This engagement will be described more completely in connection with the operation of the device.

As has been described, the switch B comprises an identical pair of parts to those of the switch A, but arranged in mirror image position.

Bridging the two control handles 5 of the switches A and B (see Fig. 1) is a bar 211, which has centrally mounted thereon a handle 213. By means of the bar 211 and handle 213 the switches A and B are operated simultaneously with results as pointed out hereinafter.

In order to understand the operation of the switch as a whole, the detailed operation of the single switch A will be described. Switch B operates in the same manner as switch A with the exceptions to be indicated.

Fig. 5 represents the switch as a whole in its disconnected "off" position with the knurled wheel 4 set for zero time delay. With the knurled wheel 4 so set, the nose 187 of the sector gear 183 is engaging the projection 207 and holding the latch 191 out of operating position with respect to the hammer saddle 65. In other words, with the knurled wheel 4 at its "zero" setting, the latch 191 is ineffectual to prevent motion of the hammer saddle 65.

If it be desired to make a connection without any time delay, the main switch control handle 5 is thrown to the left and the overcentering action of the compression spring 51 swings the hammer saddle 65 to the left and causes the contactor bar 95 to complete the circuit between the terminal pieces 75 and 77.

If, however, it is desired that a time delay be interposed between the time at which the control lever 5 is thrown to the left and the time that the contact is made, the knurled wheel 4 is rotated to the proper indicia as determined by the period of time desired. For example, each rotation of the knurled wheel 4 may represent a four-hour interval, a 90° rotation thereby representing a one-hour interval. On account of the arrangement hereinbefore described the knurled wheel 4 may be set to represent any time up to four times its single rotation time, or sixteen hours total. Indicia on the knurled wheel 4 per se and on the main spring cover plate 127 makes the reading of the desired time interval possible.

Rotation of the knurled wheel 4, in the manner described, removes the nose 187 and the sector gear 183 from engagement with the projection 207 of the latch lever 191, and thus permits the latch lever 191 to spring into position to intersect movement of the hammer saddle 65 under the influence of the leaf spring 201. Likewise upon rotation of the knurled wheel 4, tension is placed upon the main spring 119, with the result that a reverse torque is placed upon the main shaft 109 and the escapement mechanism commences to operate. The regulated motion of the escapement mechanism permits the main shaft 109 to rotate back to normal position only at a slow, predetermined rate. Immediately after the knurled wheel 4 has been rotated to its proper setting, the control handle 5 is thrown to its left-hand position. This throwing of the control handle 5 results in a pressure being made to bear upon the hammer saddle 65 to cause it to tend to swing to the left. However, the latch 191 is interposed and prevents the hammer saddle 65 from changing its position. Fig. 8 represents the various elements of the switch at this stage of operation.

With the elements positioned as in Fig. 8, the escapement mechanism slowly permits the main shaft 109 to rotate back to its normal "zero", position. As the shaft 109 approaches its normal position, the nose 187 on sector gear 183 moves into contact with the projection 207 on the lever 191 and ultimately, as the shaft 109 reaches its normal position, depresses the lever 191 to the extent that the projection 195 is forced out of engagement with the hammer saddle 65, and into the region of the notch 74. At the time the latch 191 is removed from engagement with the hammer saddle 65, the compression spring 51 immediately snaps the hammer saddle 65 sharply to the left, with the result that said hammer saddle rotates the contactor bar 95 into contact with the terminals 75 and 77 thereby completing the circuit after the desired interval of time has elapsed.

Disregarding the position of the latch lever 191, Fig. 9 correctly represents the relative positions of the elements at this stage of operation.

If, with the connections made and the elements positioned as above described, it is desired to disconnect the switch without time interval, this may be accomplished by allowing the knurled wheel 4 to remain at its "zero" position and throwing the control handle 5 from the left to the right. Again, with the narrow wheel 4 at its "zero" position, the latch 191 is out of engagement with the hammer saddle 65 and manipulation of the control handle 5 results in an immediate throwing of said hammer saddle to the right, with the result that the contactor bar 95 is removed from connection and the circuit is broken.

If, however, it be desired that an interval of time pass between the instant of throwing the control handle back to the right-hand "off" position, the manipulation is similar to that described in connection with the introduction of a time interval for the making of the circuit contact. In this event, the knurled wheel 4 is again rotated until the proper setting is secured. With rotation of the knurled wheel 4, as has been described hereinbefore, the latch 191 is brought into operative position and the escapement mechanism started in operation. If the control handle 5 is now thrown to the right-hand position, the projection or nose 195, this time by means of its left-hand end, intercepts the motion of the hammer saddle 65. After the desired interval of time has elapsed, the latch 191 is again pushed by the timing train out of engagement with the hammer saddle 65 and the hammer saddle 65 then immediately snaps to disconnect the contactor bar 95.

It is thus seen that with a single adjusting means, comprising the knurled wheel 4, a time delay interval may be introduced both for the making and the breaking of an electrical connection within the switch. If at any time after such time delay feature has been put into operation, it is desired to hasten the time of either making or breaking the contacts this may be accomplished by manually turning the knurled wheel back to its "zero" position, with which turning the latch 191 is manually brought out of operative relationship with the hammer saddle 65 and said hammer saddle permitted to swing freely. It is to be understood that such adjustments may be achieved regardless of the relative condition of the various elements of the switch, or whether the escapement has started to run and has not completely expired, or the like.

The particular advantage of the present invention over the similar invention disclosed in application Serial Number 578,596 consists in the manner in which with a single manipulation of the handle 213, a pair of future operations may be effected. As has been indicated either of the switches may be arranged for time-conditioned operation depending upon the initial position of the switch handles 5 and the appropriate manipulation of the knurled control wheels 4. That is, either the switch A or the switch B may be separately be conditioned to function in one of the following three manners:

1. Without the introduction of time-conditioning means, the switch may function as a direct or instantaneous switch, responding to make and break connections instantaneously upon manipulation of the handle.

2. Or, by introduction of the time-conditioning element prior to the moving of the handle from on to off position, the switch may be conditioned to break connections at a predetermined time in the future.

3. Or, introduction of the time-conditioning element prior to the moving of the handle from off to on position, the switch may be conditioned to make connections at a predetermined time in the future.

By means of the single-control handle 213, operating by a single manipulative movement, both the switches A and B, various permutations and combinations of the above three types of operations are effected with distinctly advantageous results. The various permutations and combinations are illustrated diagrammatically in Figs. 16 to 31. In these figures a set of conventional showings has been adopted which enables their significance to be appreciated more readily.

On each of the three sheets including Figs. 16 to 31, the left-hand column of figures (bearing even numbers) represents the various conditioned operations of a switch such as that shown in the prior figures of the drawings in which, broadly speaking, it may be said that the two contactor bars 91 are in phase for normal operation, that is, when the bar 91 of switch A is disconnected the bar 91 of switch B is also disconnected (except for time-conditioned operations, as will be seen hereinafter). On the other hand, the right-hand column of figures (bearing odd numbers) indicate the operation of a switch in which the contacting bars 91 are arranged out of phase, that is, in their "rest" positions, the contactor bar 91 of switch A may be in contact-breaking position, as illustrated in Fig. 5, while the contact bar 101 of switch B is in contact-making condition (the reverse of Fig. 5). This may be accomplished simply by a relocation of the terminal pieces 75 and 77 in the switch B, as illustrated by dotted lines and numerals 215 and 217 in Fig. 5.

This alternative construction will be referred to hereinafter as an "out-of-phase" condition.

Figure 16:
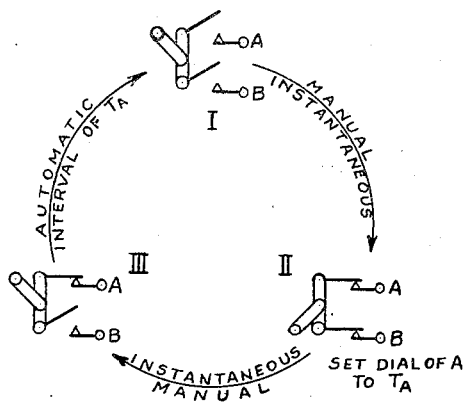

Considering first Fig. 16, numeral I indicates the rest position of switches A and B of the in-phase construction. If both the knurled wheels 4 are left at their zero settings and the handle 213 is manipulated, both switches A and B pass from disconnecting to connecting position, as indicated at II. If the dial of switch A is now set to a time interval such as Ta, and the handle is again manipulated, the condition represented at numeral III immediately takes place, this position representing the instantaneous opening of switch B and the restrained opening of switch A. After the time interval Ta has expired, the switch automatically passes from position III to its initial position I.

It will be seen that throughout the cycle of operations represented in Fig. 6, the switch B has functioned as a non-time-control switch, while the switch A has contemporaneously functioned as a delayed time-off switch. The advantage of such an arrangement may be found in control of a pair of electrical circuits, wherein it is desired that both circuits be instantaneously closed on a manipulative action, but that only one of the circuits be instantaneously broken on a second manipulative action, the second circuit functioning automatically to cut itself off after a predetermined time. For example, in certain house-heating oil furnaces, two motors are provided, one of which controls the pump which supplies the fuel to the furnace and the other of which operates a blower. It is desirable that the blower and the fuel pump go on at the same time, but it is always desirable that the blower remain going for a short time after the fuel pump has been turned off, in order that residual vapors may be blown from the furnace and deleterious condensation prevented. The present invention conditioned for operation as is indicated in Fig. 16, accomplishes such a purpose.

Figure 17:
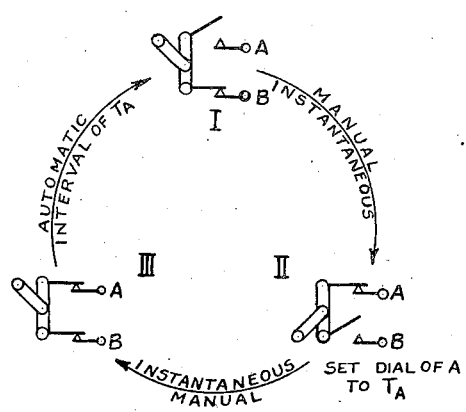

Fig. 17 illustrates an analogous set of conditions for the out-of-phase switch construction. That is, the Fig. 17 cycle represents the same sequence of manipulative action as the Fig. 16 cycle. The same relationship is borne by all figures of the left-hand column and figures of the right-hand column throughout the three sheets of diagrammatic drawings.

The Fig. 17 cycle, unlike the Fig. 16 cycle, permits the circuits controlled by switches A and B to be on at the same time only for a predetermined interval of time, represented by the interval between conditions III and I. At other times, either one or the other of the circuits is on but not both of them. There are numerous electrical arrangements which require just such a circuit control.

Figure 18:
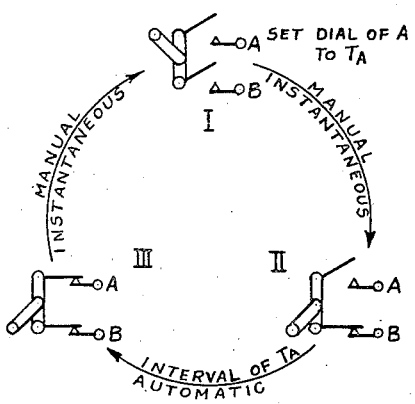
Figure 19:
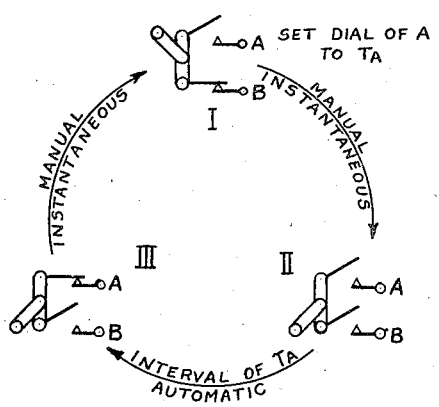

Figs. 18 and 19 show cycles of conditioned operation analogous to Figs. 16 and 17 respectively, but utilizing switch A as a time-on switch instead of a time-off switch. A detailed description of these figures is considered unnecessary as the legends thereon tell the story of the sequence of operations thereby effected.

Figs. 16, 17, 18, and 19 thus far described, represent conditioned operations in which the time control is used for only one of the pair of switches A and B.

The subsequent figures (20–31) indicate conditioned operations in which the time control feature is applied to both switches A and B. With such a feature the condition of operations becomes more complicated and each cycle has a total of four positions rather than three as in Figs. 16 to 19.

Figure 20:
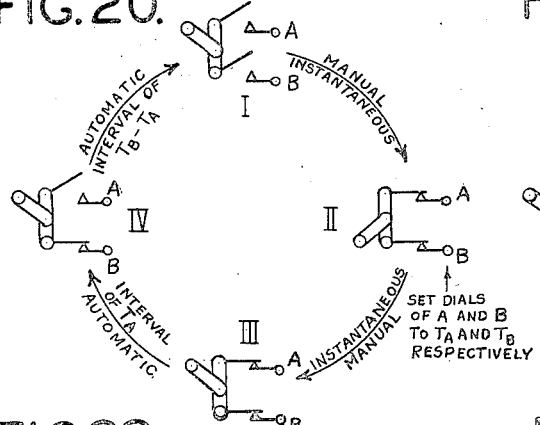
Figure 21:
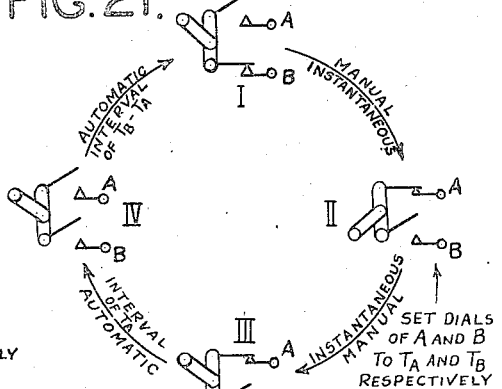

While a detailed description for each of Figs. 20 to 31 will not be given, the following generalizations apply:

In Figs. 20 and 21, both switches are employed as time-off switches, and are set at the same time.

Figure 22:
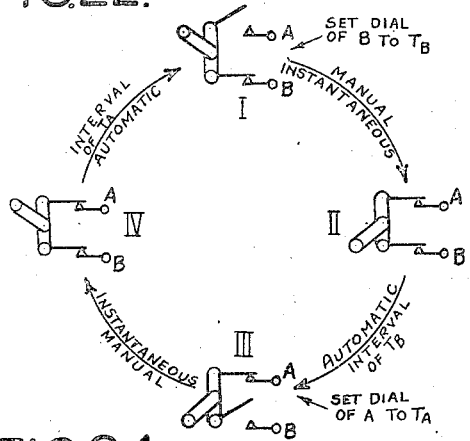
Figure 23:
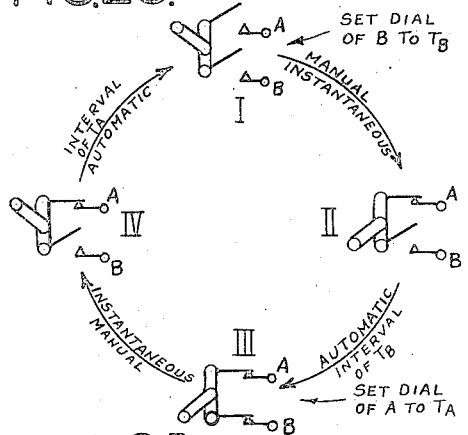

In Figs. 22 and 23 switch A is employed as a time-off switch, as is switch B, but the time control elements are introduced separately at various stages of the cycle.

Figure 24:
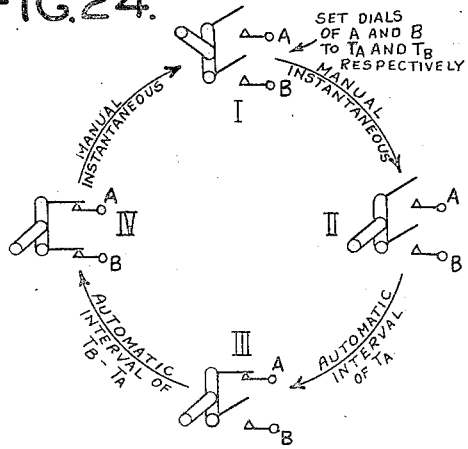
Figure 25:
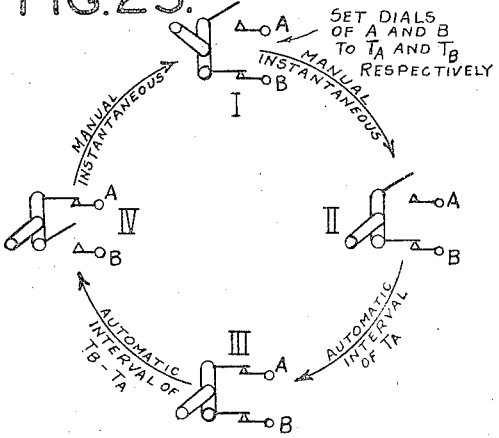

In Figs. 24 and 25, both switches A and B are utilized as time-on switches and are operated contemporaneously during the cycle.

Figure 26:
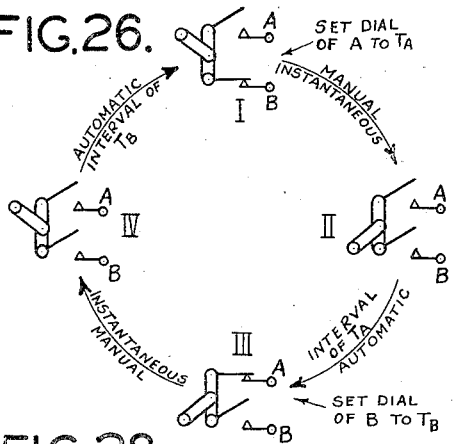
Figure 27:
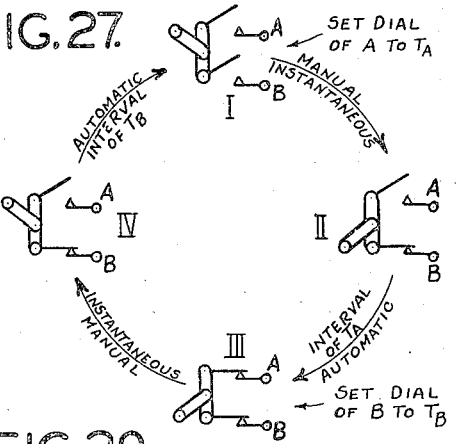

In Figs. 26 and 27 switches A and B are both operated as time-on switches, but the time-control element is introduced at different stages in the cycle of operations.

Figure 28:
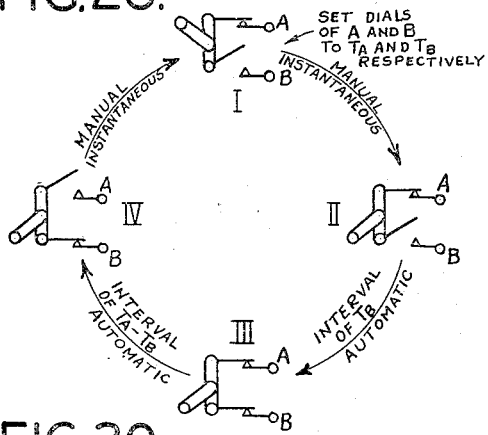
Figure 29:
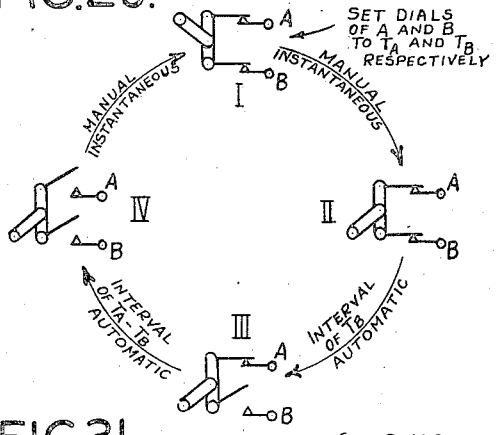

In Figs. 28 and 29 switch A is operated as a time-off switch and switch B is operated as a time-on switch, and both timing operations are employed contemporaneously.

Figure 30:
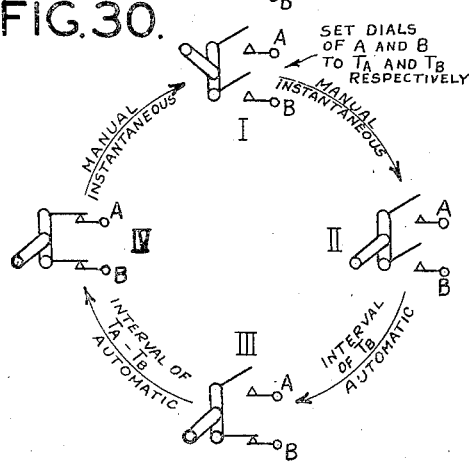
Figure 31:
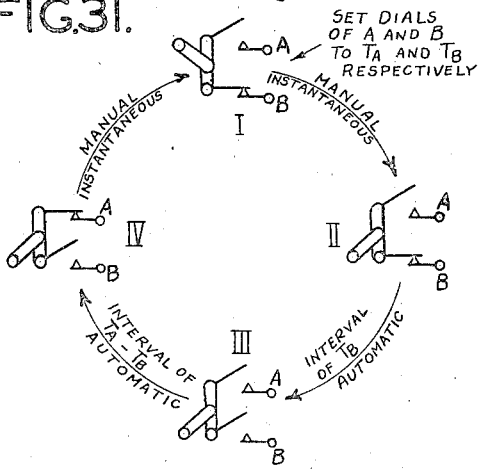

In Figs. 30 and 31, the sequence of operations is not essentially different from Figs. 24 and 25 respectively, but, for purposes of illustration, the relative time intervals of the switches A and B have been interchanged.

With each of the cycles represented by Figs. 20–31 inclusive, a different type of control of a pair of electrical circuits may be effected. Also, if the switches A and B are connected in series, a still further sequence of operations may be effected, this time upon a single electrical circuit. For example, considering the cycle illustrated in Fig. 25, with the switches A and B connected in series, the following type of control may be effected. With the switch initially in its condition indicated by I, the dial of switch A is set to a predetermined interval Ta and the dial of switch B is set to an interval Tb greater than Ta. The switch handle is then manually thrown to position II. This initiates action of the timing trains. After the interval of Ta, the switch A closes the circuit. As the switch B is already closed, this completes the series connection, and current flows. However, switch B is meanwhile running as a time-off switch and when interval Tb has expired, switch B breaks connection, thus stopping the current flow through the series arrangement. It will be seen that with only one manual operation the circuit has been automatically arranged such that at a predetermined adjustable time in the future, the circuit is closed, and after another predetermined, adjustable time, the circuit is opened.

Applying this to a practical operation, let it be considered that the switch is employed in a radio receiving set. By the manipulation described, the receiving set may be arranged so that, say at five o'clock, the radio is turned on for the reception of a certain program, and at five-thirty, upon the completion of said program, the radio is automatically turned off. The application of this type of switch will be readily apparent.

The conditions of operations represented by the various other figures have similar applications, which would only be burdensome to describe and which would serve no useful purpose.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A switch comprising, in combination, a plurality of separate time-controlled switches, each of which separate switches includes means for delaying the making of contacts of that switch and for delaying the breaking of contacts of that switch, and a single manipulatory means for setting said plurality of switches simultaneously.

2. Circuit controlling means comprising, in combination, a plurality of separate time-controlled switches, means associated with said switches for optionally, individually, delaying either the making or the breaking of contacts within said switches for a predetermined time interval after a setting action, and means effecting said setting action simultaneously for said plurality of switches.

3. Circuit controlling means comprising, in combination, a plurality of separate time-controlled switches, means associated with said switches for optionally, individually, delaying either the making or the breaking of contacts within said switches for a predetermined time interval after a setting action, means for adjustably, separately determining said time interval for each of said switches, and means effecting said setting action simultaneously for said plurality of switches.

4. Circuit controlling means as set forth in claim 3, in which the plurality of switches are electrically independent of each other.

5. Circuit controlling means comprising, in combination, two time-controlled switches, each of which switches comprises a pair of terminals, a contactor bar movable to connect and to disconnect said terminals, mechanical actuating means for said contactor bar operable by manipulation from the exterior of said switch, and a time-controlled latch movable into position to intercept motion of said contactor bar either to connect or to disconnect said terminals after actuation thereof by said mechanical actuating means; and means connecting the mechanical actuating means of said two switches whereby simultaneous manipulation of said means is effected.

6. Circuit controlling means as set forth in claim 5, in which separate means are provided for each switch adjustably predetermining the intervals of time for which their respective latches shall be operable.

7. Circuit controlling means as set forth in claim 5, in which separate means are provided for each switch adjustably predetermining the intervals of time for which their respective latches shall be operable, said last-named means being also operable to remove their respective latches from operative position regardless of the direction of motion of said contactor bars.

8. Circuit controlling means as set forth in claim 5, in which the two switches are electrically independent of each other.

9. Circuit controlling means as set forth in claim 5, in which separate means are provided for each switch for removing the respective latches from operative position regardless of the direction of motion of said contactor bars.

MARCUS H. RHODES.